Sept. 11, 1934.  J. K. HODNETTE  1,973,073
ELECTRICAL APPARATUS
Filed June 17, 1932   4 Sheets-Sheet 1

WITNESSES:

INVENTOR
John K. Hodnette
BY
ATTORNEY

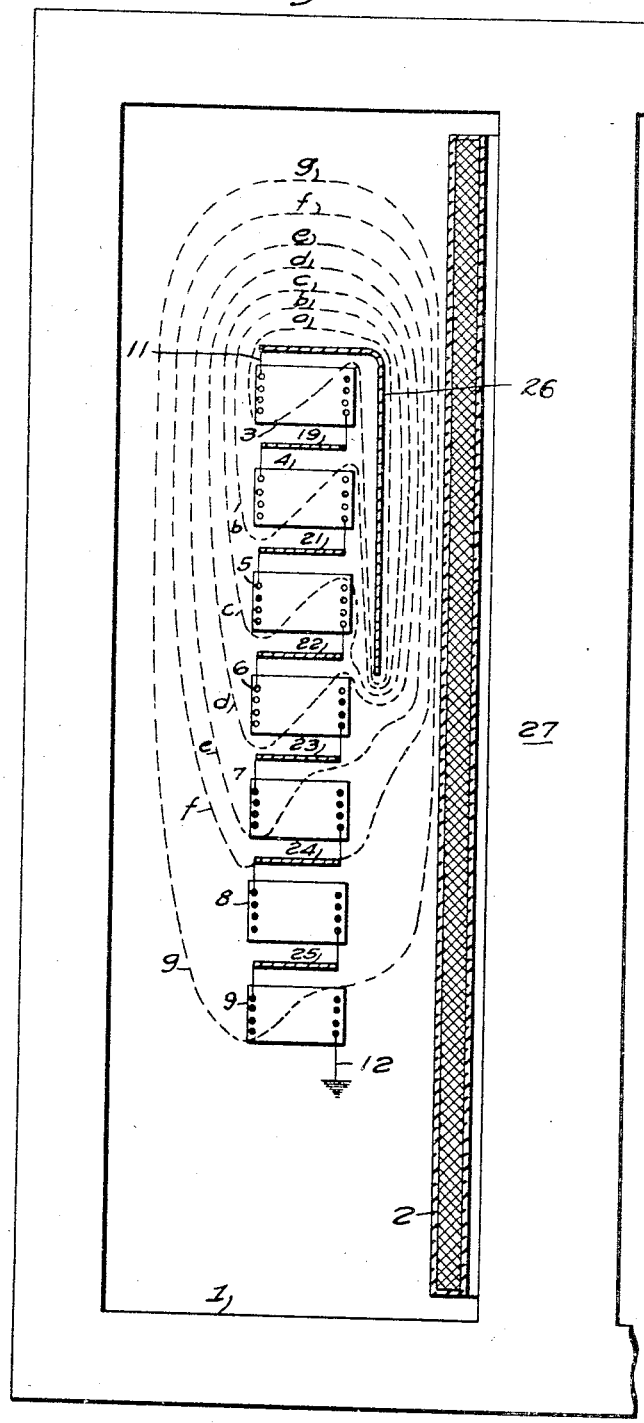

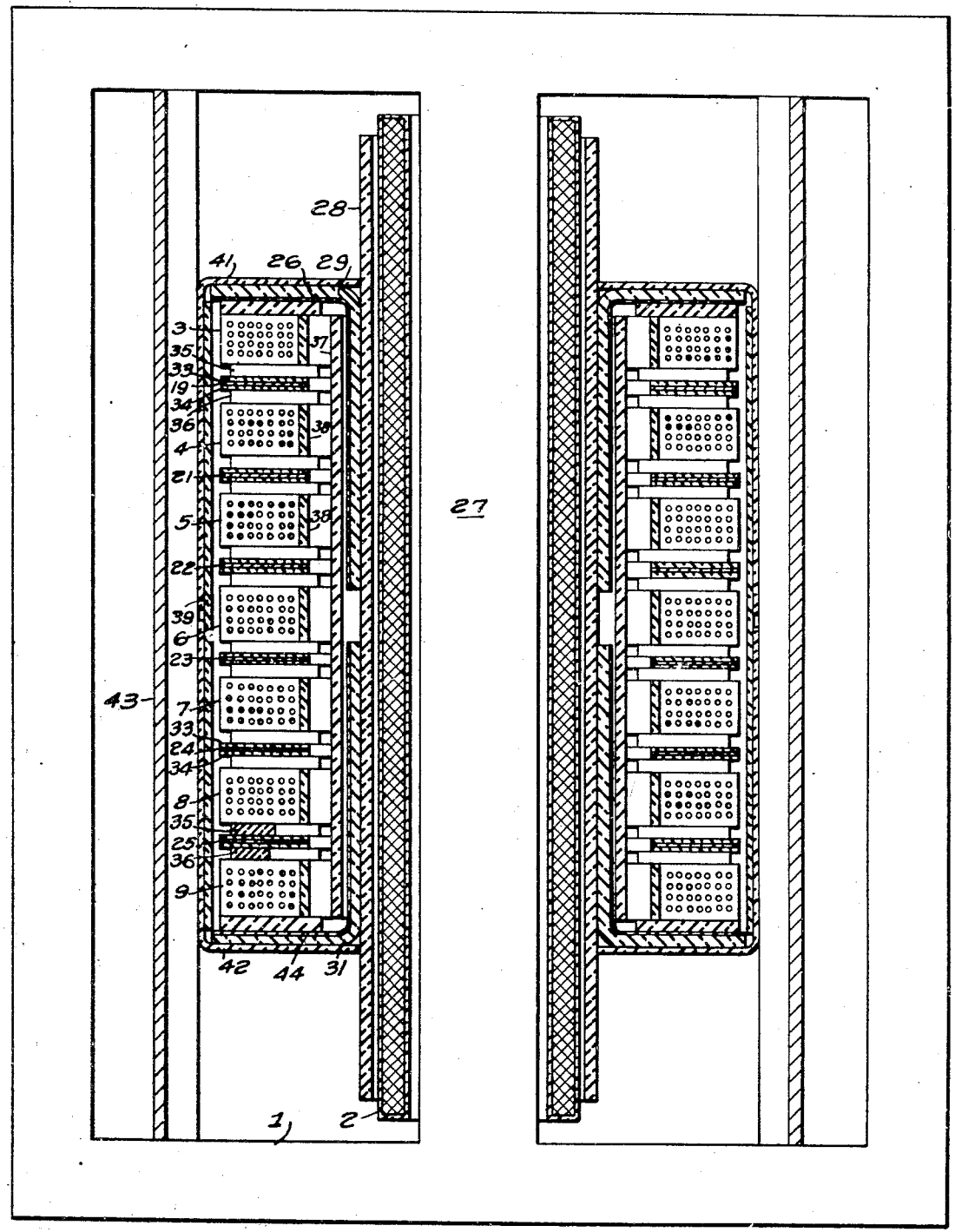

Sept. 11, 1934.   J. K. HODNETTE   1,973,073
ELECTRICAL APPARATUS
Filed June 17, 1932   4 Sheets-Sheet 4
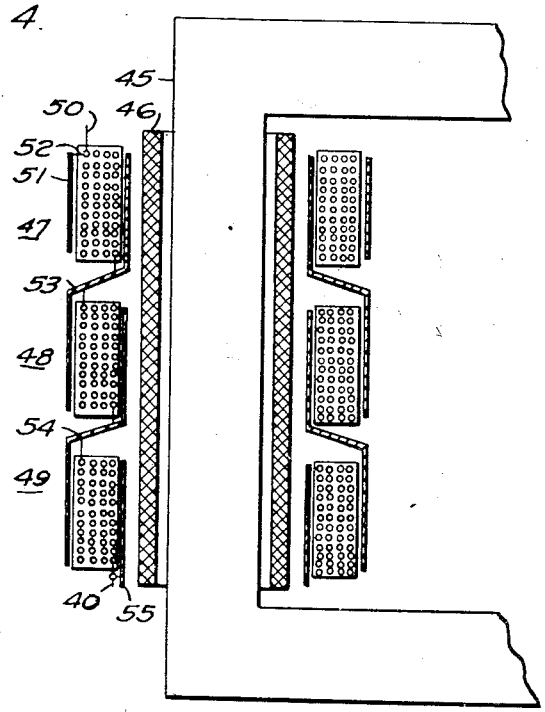
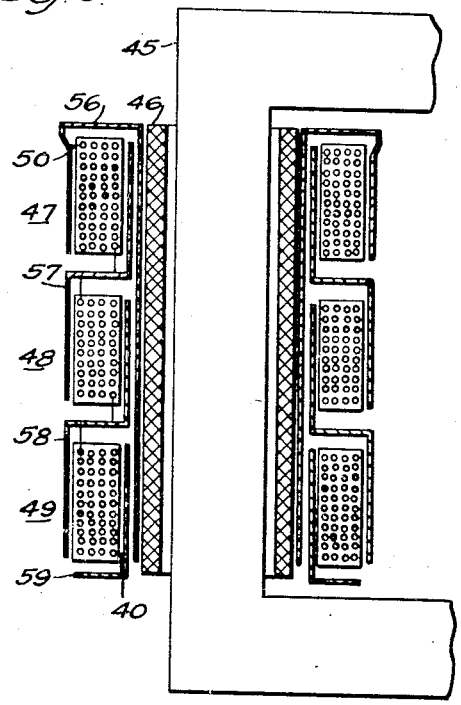
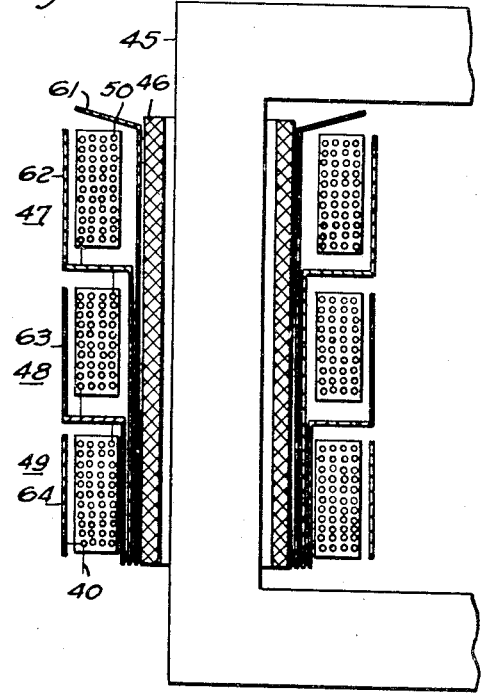
WITNESSES:
INVENTOR
John K. Hodnette.
BY
Franklin E. Hardy
ATTORNEY Patented Sept. 11, 1934

1,973,073

UNITED STATES PATENT OFFICE

1,973,073

ELECTRICAL APPARATUS

John K. Hodnette, Sharon, Pa., assignor to Westinghouse Electric & Manufacturing Company, East Pittsburgh, Pa., a corporation of Pennsylvania Application June 17, 1932, Serial No. 617,789

12 Claims. (Cl. 175—356)

My invention relates to methods of and means for improving the electrostatic distribution of surge voltages in the windings of electrical apparatus.

In the windings of electrical apparatus, such as transformers, that are connected to a transmission line, the voltage between the terminals of the winding varies uniformly from one end of the winding to the other under normal frequency and voltage conditions of the system. However, during certain conditions of the system, such as may be caused by lightning or by switching operations on the transmission line, a high-voltage surge may occur on the transmission line and enter the winding of the transformer.

In windings of the usual construction, a voltage surge will not immediately distribute itself along the winding in a manner to establish a uniform voltage gradient thereon, but its initial distribution results in high concentration of voltage stress on parts of the winding connected near the line terminal. This initial voltage gradient results from the values of the electrostatic conditions existing between the winding and ground, and between adjacent portions of the winding, such as between coils and between different winding turns.

Because of the inductance and distributed capacity of the winding, a redistribution of the energy takes place, causing oscillations in the winding of the voltage values about or corresponding to its final or uniform distributed value. The amplitude of the oscillations will initially correspond to the difference between the initial voltage and the final voltage distribution along the winding. This oscillation creates successive voltage stresses between adjacent parts of the winding and between the winding and ground.

The problem of insulating the conductors and coils of a transformer winding to withstand the surge voltages impressed upon them is a difficult one, because, in the usual construction of these parts, the conductors are so small that satisfactory means of applying sufficient insulation to withstand the voltage stresses are not readily available, and if sufficient insulating material is applied about the conductors, the space factor between the conductors becomes so large as to adversely effect the efficiency of the design. It is, therefore, desirable to provide means for lessening the voltage stress between the several parts of the winding that are caused by the concentration of surge voltages in order to produce satisfactory operation of the apparatus.

This invention is applicable to transformers constructed with multiple layer wire coils, that is, coils that are wound with a plurality of layers, each layer having a number of winding turns, and also to strap wound coils, that is coils in which the conductor is in the form of a flat strap and extends from the top to the bottom of the flat coil.

The multiple layer construction, in particular, gives an inherently poor electrostatic distribution of voltage because an electrostatic field is set up at the instant of impact around a few turns of relatively small area. In this type of winding, the length of the winding column or stack of coils is usually quite long, as compared to its width or thickness. This design further accentuates the non-uniformity of the electrostatic field.

Tests indicate that 60 to 80% of the total surge voltage may appear across a small percentage of the winding at the high-voltage end thereof represented by perhaps a pair of coils.

It is an object of my invention to provide electrostatic plates in an electrical apparatus comprising a plurality of winding coils connected in series, so positioned and dimensioned as to substantially neutralize the capacitance current to ground, and between adjacent winding coils, upon the occurrence of a rapid change in voltage across the winding of the electrical apparatus.

Another object of my invention is to provide means for protecting the winding of an electrical apparatus from the transient voltage distribution effect of a surge entering the winding.

A further object of my invention is to provide electrostatic plates in the spaces between the coils of a winding stack of a continuous winding and in the space between the winding stack and ground.

In the drawings,

Fig. 2 is a view of a similar transformer winding to which electrostatic plates have been positioned between the coils of the winding stack, and between the winding stack and the low-voltage winding.

Fig. 3 illustrates a sectional view of a transformer constructed in accordance with my invention.

Figs. 4, 5 and 6 illustrate sectional views of transformers employing different arrangements of the static shields.

Figure 1:
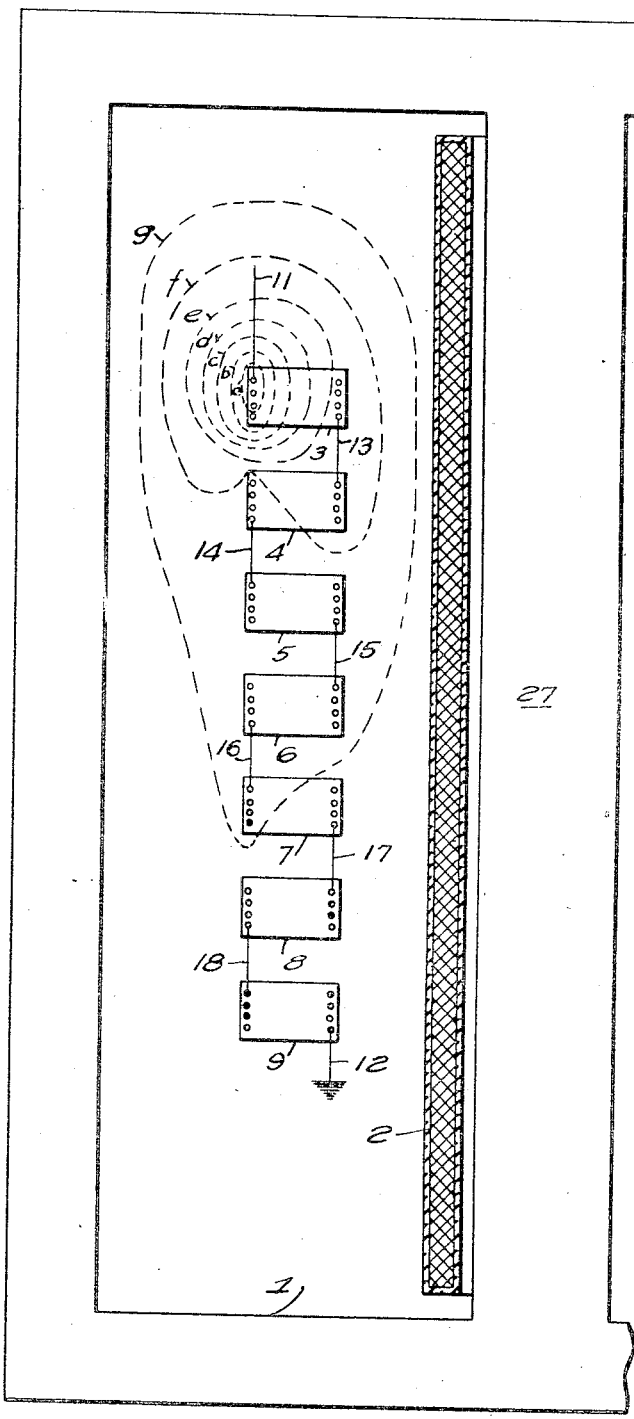
Figure 1 is a schematic sectional view of a portion of the winding of a transformer, the high-voltage winding employing a column of multiple turns per layer wire-wound coils, showing the equipotential electrostatic surfaces illustrating the concentration of voltage in an ordinary transformer of this type.

Referring to Fig. 1 of the drawings, a portion of the iron core 1, forming the magnetic path of the apparatus, is illustrated, and is provided with a winding leg about which the low-voltage winding 2 is first positioned, and about which winding the high-voltage winding comprising the stack of coils 3, 4, 5, 6, 7, 8 and 9, connected in series, are positioned. In the coils forming the stack, the inner and outer layer of conductors are illustrated in section, it being understood that the space between these layers is filled with successive layers of winding turns, connected in series.

During normal operation of the transformer, the voltage is evenly distributed over the entire winding which extends from the high-voltage terminal 11, shown at the upper end of the coil stack, to the low-voltage, or ground terminal 12, shown at the lower end of the coil stack, the several coils being connected in series through the illustrated conductors 13, 14, 15, 16, 17, and 18.

The dotted lines $a$, $b$, $c$, $d$, $e$, $f$ and $g$ forming paths about the high-voltage terminal 11 illustrate the location of the equipotential surfaces having like voltage steps therebetween which exist under transient voltage excitation, that is, upon the occurrence of a surge voltage in an ordinary transformer of the type illustrated. It will be noted that the first five lines shown indicated $a$, $b$, $c$, $d$ and $e$, and corresponding to equal steps in percentage of the voltage impressed across the entire winding, each cut the first coil of the high-voltage stack, indicating that more than 50% of the impact voltage is initially impressed across this coil of the winding, and that a very large percentage of the impact voltage is impressed across the two first coils of the winding. This indicates that the first few turns only of the winding are effective in establishing the electrostatic field at the instant of impact of a rapidly rising voltage surge, or, in other words, that the capacitance between these turns and other elements of the winding determines the initial potential difference between them.

Referring to Fig. 2 of the drawings, in which a similar high-voltage winding stack is employed, the connections between the coils of the stack are effected through metallic plates 19, 21, 22, 23, 24 and 25, respectively, that are in the form of metallic washers nearly surrounding the winding leg of the core. A line static plate 26 is also provided, extending across the end of the stack, that is, across the line end of the first coil 3 of the winding, and along the winding stack in a space between the coils 3, 4 and 5, and the low-voltage winding 2. The line static plate 26 is connected to the terminal 11 of the winding and, therefore, provides a high or 100% equipotential surface in the space occupied by it. The several plates 19, 21, 22, 23, 24, 25 and 26 extend about the axis of the winding leg 27 of the core 1, and are substantially continuous except for a slot to prevent them from forming short-circuited conducting turns about the winding leg of the core.

It will be noted that the equipotential surfaces which formerly cut the first coil of the winding are now carried well down toward the center of the winding stack, and are much more evenly distributed along the stack. For example, the equipotential line $d$ corresponding to a dielectric stress approximately equal to half that impressed upon the total winding, cuts the winding approximately half away between the terminals 11 and 12, and the equipotential lines $c$, $b$ and $a$ are spaced substantially equally between the center of the coil and the high-voltage end thereof, indicating that the initial impulse voltage of the surge is distributed substantially evenly along the winding.

The function of these electrostatic plates, as may be seen, is, first, to neutralize the capacities between the coils and the iron core and, second, to provide a more uniform dielectric field throughout the length of the column or, stated in another way, to provide large capacities between successive coils of the winding, and, at the same time, lessen the capacitance between the winding and ground. The increased capacities between the successive coils limits the flow of charging current necessary to supply the electrostatic field between the remaining portion of the high voltage winding and ground without building up excessive voltages across the first coil of the winding.

The value of the capacities established by these electrostatic plates should be such that the electrostatic field established by these capacities is effective to produce substantially a straight line gradient between the terminals of the winding at the instant of impact of a high voltage surge upon the winding.

Referring to Fig. 3 of the drawings, the structure providing for the arrangement of the shields illustrated in Fig. 2, is more clearly illustrated. As shown, an insulating barrier 28, such as a micarta tube, is positioned about the low-voltage winding 2. Insulating angle rings 29 and 31 are provided that extend across the ends of the high-voltage winding stack, and along the outside of the tube 28. The metallic shield 26 may be attached to the inner surface of the angle ring 29. The static plates 19, 21, 22, 23, 24 and 25 are illustrated as positioned between fullerboard plates or washers 33 and 34 that are spaced from the adjacent coils of the winding by insulating spacing members 35 and 36, which extend radially from a tube of insulating material 37.

Similar tubes 38 of insulating material, corresponding in length to the length of the individual coils 3 to 9, inclusive, may be positioned adjacent the inner surfaces of the coils. An insulating barrier 39 may be provided between the outside of the high-voltage coil stack and the outside core legs, on the outside of which may be positioned insulating barriers in the form of angles 41 and 42, extending across the outer ends of the coil assembly structure, and along the outside of the insulating barrier 39, between the barrier 39 and supporting barriers 43.

In Fig. 3 an electrostatic plate 44 is shown applied to the lower end of the winding stack. This plate is similar to the plate 26 and is connected to the end of the winding opposite to the plate 26 and extends across the end of the winding and upwardly along the inside of the winding stack. This plate would not be used when the lower end of the winding is to be grounded, but may be found desirable where the winding is operated ungrounded or where the midpoint of the winding is grounded.

The metal surface or plate 26 may be applied to the inner surface of the insulating angle ring 29 at the high-voltage end of the column, and along the area extending into the space between the high-voltage and low-voltage windings in the form of a metallic strip, or may be applied thereto as a metallic spray by means of the "Shoop" process. In a similar manner, the metallic elements of plates 19, 21 and 22 etc. may be applied to the surfaces of fullerboard or similar washers 33, 34, positioned between the coils, or metal sheets may be glued between the two halves of the fullerboard washers.

Figs. 4, 5 and 6 of the drawings illustrate embodiments of my invention that are particularly applicable to windings employing relatively few series connected coils, the individual coils in such cases being relatively thin between inside and outside diameters and being relatively long.

In each of the Figs. 4, 5 and 6 a portion of a core structure 45 having two winding legs is illustrated, only one winding leg being shown. A low voltage winding 46 is illustrated positioned about the winding leg and a high voltage winding, comprising coils 47, 48 and 49 connected in series between winding terminals 40 and 50, is illustrated positioned about the low voltage winding 46.

In Fig. 4 a line static plate 51 is illustrated surrounding the coil 47 and connected to the terminal of the winding at 52. An electrostatic plate 53 is shown having a central or connecting portion positioned and connected between the adjacent ends of the coils 47 and 48 and having end portions extending upwardly along the inside of the coil 47 and downwardly along the outside of the coil 48, respectively. The central or connecting portion need only be a conductor for connecting the end portions that extend along the curved surfaces of the coils 47 and 48. A similar electrostatic plate 54 is positioned and connected between the adjacent ends of the coils 48 and 49, and extends upwardly along the inside of the coil 48 and downwardly along the outside of the coil 49. A plate 55 is also shown extending along the inner wall of the coil 49 and connected to the winding terminal 40. It will be understood that the several electrostatic plates employed extend nearly around the winding leg of the core in the positions illustrated, there being a vertical slot in each plate to interrupt the continuity of its path about the core and thus to prevent these plates from acting as short-circuited secondary turns of the transformer.

In the embodiment of the invention shown in Fig. 5, a line static plate 56 is illustrated as connected to the winding terminal 50 and extends downwardly along the outside of the first winding coil 47, across the upper end of the winding and downwardly between the high voltage and low voltage windings substantially the entire length thereof. An electrostatic plate 57 is shown as extending between the coils 47 and 48 and downwardly along the outside of the coil 48 and upwardly along the inside of the coil 47 between this coil and the plate 56. The plate 57 is connected to the winding between the coils 47 and 48. In this embodiment of my invention electrostatic plates similar to the plate 57 are positioned between adjacent coils of the winding and extend in opposite directions along the outside and inside of the adjacent windings as, for example, the plate 58 which is positioned between the coils 48 and 49 and connected to the winding at this point. The plate 58 extends upwardly along the inner surface of the coil 48 and downwardly along the outer surface of the coil 49. A terminal plate 59 is provided extending along the inner surface of the coil 49 and across the end thereof, this coil being an end coil of the winding.

In the embodiment of the invention shown in Fig. 6 a line static plate 61 is illustrated connected to the winding terminal 50 and extending across the end of the winding and downwardly between the high voltage winding and the low voltage winding 46 substantially the entire length of the winding. Between each of the adjacent coils of the high voltage winding electrostatic plates 62 and 63 are provided connected to the winding between the adjacent coils and extending across the ends thereof and in opposite directions along the outside and the inside of the upper and lower of the two adjacent coils, respectively. Each of these electrostatic plates are illustrated as extending downwardly to substantially the bottom of the winding stack. An electrostatic plate 64 is provided surrounding the lower coil 49 of the high voltage winding stack and connected to the winding terminal 40.

It will be noted that in each illustrated embodiment of the invention an electrostatic field exists between two plates, one on each side of the conductors forming the turns of the individual coils or groups of winding turns. The areas of the metal surfaces are much larger than that of the winding conductors and are therefore capable of inducing a much larger electrostatic charge across the space occupied by the conductors of a winding coil. In the arrangement of the plates illustrated in Figs. 2, 3, 4 and 6, the electrostatic charges are induced in series between the terminals of the winding. That is, in Fig. 4, for example, a charge is induced between plates 51 and 53, between plates 53 and 54, and between plates 54 and 55, in series between the terminal connected plates 51 and 55.

In the embodiments of the invention illustrated in Fig. 5, electrostatic charges are induced directly between the line static plates 56 and each of the remaining plates of the structures. These electrostatic capacities are connected in parallel.

In the embodiment of the invention illustrated in Figs. 5 and 6 the line static plates 56 and 61, respectively extend the entire length of the winding in the space between the high and low voltage windings thus supplying the charging current to ground directly from these plates. These plates might be arranged about the high voltage winding in which case the charging current to ground would flow from the high voltage winding, it being supplied to the winding turns from the line plate instead of through the winding itself.

Many modifications may be made in the apparatus illustrated and described, without departing from the spirit of my invention, and I do not wish to be limited other than by the scope of the appended claims.

I claim as my invention:

1. In an electrical transformer, a magnetic core having a winding leg, a low-voltage winding about said winding leg, a high-voltage winding about said low-voltage winding and comprising a plurality of coils connected in series, a metallic plate adjacent the end of the coil stack and extending therefrom into the space between the high-voltage and low-voltage winding.

2. In an electrical apparatus, a relatively low-voltage winding, a relatively high-voltage winding positioned about said low-voltage winding, and comprising a plurality of winding coils connected in series between line terminals, and a metallic plate connected to one of said terminals and extending across the end of the high-voltage winding and along the winding in the space between the high-voltage and the low-voltage winding.

3. In an electrical apparatus, a relatively low-voltage winding, a relatively high-voltage winding positioned about said low-voltage winding and comprising a plurality of winding coils spaced apart and connected in series between a high-voltage terminal and ground, electrostatic shields positioned between certain of said winding coils, and an electrostatic shield connected to said high-voltage terminal and extending across the end of the high-voltage winding and along the winding in the space between the high-voltage and the low-voltage winding.

4. In an electrical apparatus, an electrical winding comprising a plurality of multiple layer winding coils arranged along a common axis and connected in series between a high-voltage terminal and ground, electrostatic plates positioned and connected between adjacent winding coils, and an electrostatic plate connected to said high-voltage terminal extending across the high-voltage end of the winding and along the winding to supply the charging current to ground.

5. Electrical induction apparatus having spaced groups of winding turns connected in series between a grounded terminal and a high-voltage terminal, each group comprising a plurality of concentric layers of winding turns, electrostatic plates positioned between adjacent groups of turns and electrically connected thereto, and an electrostatic plate connected to said high-voltage terminal and extending along the groups of winding turns to decrease the electrostatic stress and the flow of charging current from said winding groups to ground.

6. Electrical induction apparatus having a winding comprising a plurality of spaced coils connected in series, means for providing a substantially uniform dielectric field throughout the length of the winding comprising electrostatic plates on opposite sides of the individual coils between which an electrostatic charge is induced for limiting the voltage between the terminals of the coils, each plate, excepting those connected to the winding terminals, being electrostatically coupled between adjacent winding coils to provide a large capacitance between them.

7. Electrical induction apparatus having a winding comprising a plurality of groups of winding turns connected in series, means for providing a substantially uniform dieletcric field throughout the length of said winding comprising electrostatic plates connected between adjacent winding groups, said plates having a central portion extending transversely of the winding between said groups and end portions extending in opposite directions along the inside and outside of adjacent coil groups, respectively.

8. Electrical induction apparatus having a winding comprising a plurality of spaced coils connected in series, means for providing a substantially uniform dielectric field throughout the length of said winding comprising electrostatic plates connected between adjacent winding groups, said plates having a central portion extending transversely of the winding between said groups and end portions extending in opposite directions along the inside and outside, respectively, of adjacent groups and an electrostatic plate connected to a terminal of the winding and extending across the end of the winding and along the winding between the winding turns and ground.

9. Electrical induction apparatus having spaced groups of winding turns connected in series, means for providing a large capacitance between said winding groups comprising plates on opposite sides of said winding groups connected to the winding circuit at the ends of the individual groups of winding turns, and an electrostatic plate connected to a terminal of the winding and extending across the end of the winding and along the winding to supply the charging current to ground.

10. In an electrical apparatus, an electrical winding comprising a continuous column of coils arranged along a common axis and connected in series, and means for providing a substantially uniform delectric field throughout the length of the winding column upon a voltage surge entering the winding comprising a plurality of electrostatic plates distributed along the column and positioned between the coils thereof for inducing a plurality of electrostatic charges in series between the terminals of the winding in the space occupied by the winding conductors.

11. Electrical induction apparatus having a winding comprising a plurality of coils of winding turns connected in series, means for providing a substantially uniform dielectric field throughout the length of the winding turns of the individual coils comprising electrostatic plates connected between adjacent coils, said plates extending in opposite directions along the inside and the outside of adjacent coils, respectively.

12. In an electrical apparatus, inductively related low-voltage and high-voltage windings, said high-voltage winding being spaced from and surrounding said low-voltage winding and comprising a plurality of multiple-layer-winding coils arranged along a common axis and connected in series between a high-voltage terminal and ground, and electrostatic shields positioned and connected between adjacent winding coils.

JOHN K. HODNETTE.